April 28, 1959     M. B. ELSDON     2,884,008
VALVE INTERLOCK MEANS
Filed March 25, 1957
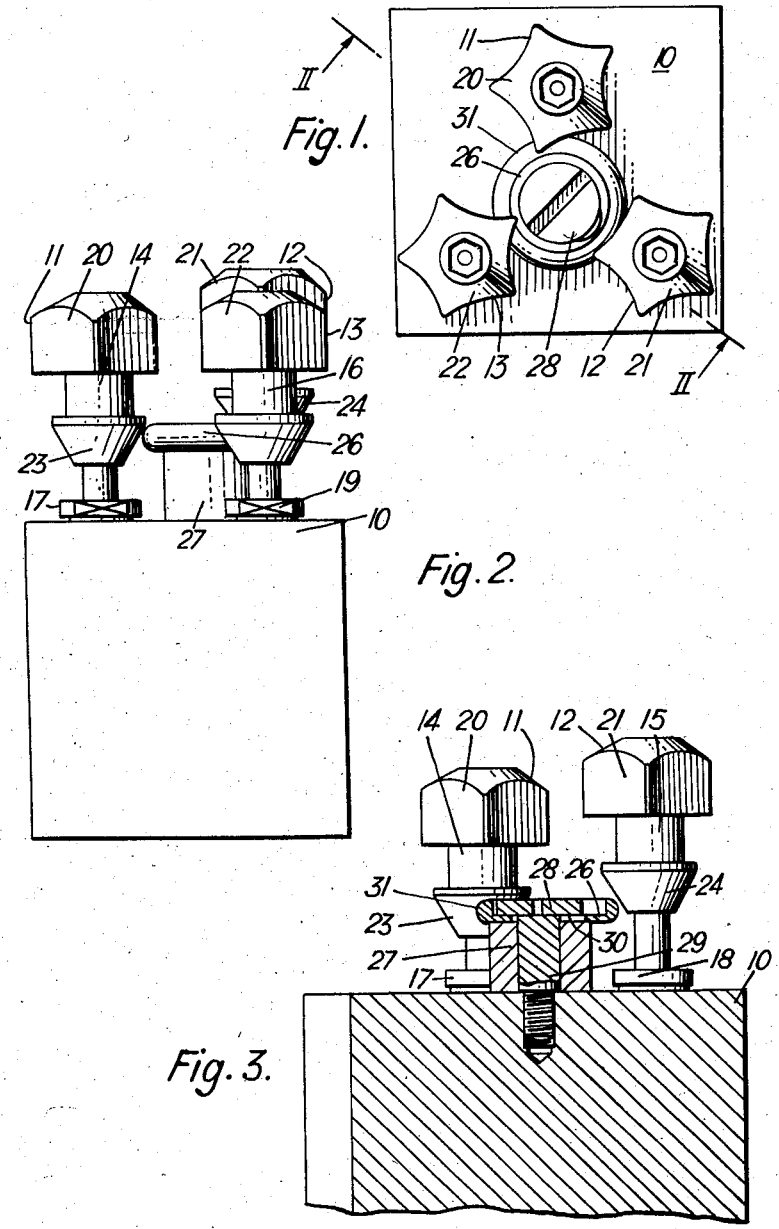
Inventor
MICHAEL BISHOP ELSDON
By Aaron R. Townshend
Attorney United States Patent Office 2,884,008
Patented Apr. 28, 1959

2,884,008
VALVE INTERLOCK MEANS

Michael Bishop Elsdon, Sawbridgeworth, England, assignor to The British Oxygen Company Limited, a company of Great Britain Application March 25, 1957, Serial No. 648,143

Claims priority, application Great Britain April 29, 1956

2 Claims. (Cl. 137—637.1)

This invention relates to valve interlock means and specifically to means for permitting the closure of any one or any two of a group of three valves but not of all three valves, the valves being of the type in which the valve is closed by screwing down a valve spindle into a common valve block and the group of three valves being arranged in a triangular formation with the valve spindles substantially parallel.

In certain cases where such a group of three valves is used, it is desirable that not more than two of these valves should be closed at the same time. A particularly important example is in 3-nozzle flame cutting machines of the type in which oxygen and a fuel gas are mixed in a common mixing chamber and the oxygen-fuel gas mixture is then distributed to the separate nozzles through individual trimming valves. It has been found that if all the trimming valves are closed simultaneously, there is a danger of feed back of the mixed gases from the mixing chamber up the oxygen and fuel gas supply lines, with the consequent danger of damage to these lines in the event of a flash-back occurring when the flame is relit.

According to the present invention, interlock means for permitting the closure of any one or any two of a group of three valves of the type specified comprises a member located between the valves and adpated to be moved on closure of any two valves into a position to prevent the closure of the third valve.

In a preferred form of the invention, the moving member is a floating disc adapted to float in a plane normal to the axes of the valve spindles, the periphery of the disc being adapted to engage the valve spindles, the spindles being so shaped as to move the disc on closure of two of the valves into a position where engagement between the disc and the third valve spindle prevents closure of the third valve. The spindles may be formed with a part of frusto-conical section converging towards the valve block. Alternatively, the part of the valve spindle engaging the disc may be of hemispherical section with the curved face towards the valve block.

In an alternative arrangement according to the invention, the movable member is in the form of a cone, frusto-cone or hemisphere having its wider end adjacent the valve block, the curved surface of the member being adapted to engage annular projections on the valve spindles.

Alternatively, the movable member may be a sphere adapted to roll freely on a plane surface between the valves, which may be the surface of the valve block, the diameter of the sphere being such that annular projections on the valve spindles engage the upper surface of the sphere.

The invention will now be more particularly described with reference to the accompanying drawings in which:—

Figure 1 is a plan view of a group of three valves provided with interlock means according to the invention;

Figure 2 is a side view of the group of valves of Figure 1; and

Figure 3 is a section along the line II—II of Figure 1.

A valve block 10 is provided with three valves 11, 12 and 13 arranged in triangular formation as shown in Figure 1. These valves are of the type in which a valve spindle (14, 15, 16 respectively) is threadedly mounted within a bush (17, 18, 19 respectively) carried by the valve block 10 and is adapted to close a passage within the block 10 when its spindle is screwed down into its bush. The valves are provided with operating knobs 20, 21, 22 respectively at their outer ends. Each of the valve spindles 14, 15, 16 is provided with a projecting annular portion 23, 24, 25 respectively of frusto-conical section having its wider end adjacent the outer end of the spindle.

Mounted between the valves 11, 12, 13 is a disc 26 arranged for limited floating motion in a plane normal to the axes of the valve spindles 14, 15, 16. The disc is arranged to slide between the end surface of a sleeve 27 mounted on the valve body 10 and the head 28 of a screw 29 which passes through a hole 30 in the centre of the disc 26 and the bore of the sleeve 27 and is screwed into the block 10, the diameter of the hole 30 being sufficiently greater than that of the shank of the screw 29 to afford the required floating movement of the disc. The disc 26 is provided with an upstanding flange 31, the outer surface of which is of curved section to provide a suitable bearing surface to engage with the portions 23, 24 and 25 of the valve spindles as hereinafter described.

The diameter of the disc 26 is so chosen, with respect to the spacing of the valves, that when any two of the valves are screwed down, the engagement of the frusto-conical portions of these valves with the periphery of the disc 26 forces the disc to slide so that its periphery engages the frusto-conical portion of the third valve at a point at or near the small end of the frusto-conical portion, so that screwing down of the third valve is prevented. In the drawings, the two valves 11 and 13 are shown screwed down into the closed position, the disc 26 being forced into engagement with the frusto-conical portion 24 of the third valve 12 at a point near to its lower end.

I claim:

1. A valve assembly comprising a casing, three valves mounted therein and having each a stem extending exteriorly of the casing, actuating means including a handle attached to the outer end of each said stem, said handles having their axes in parallel spaced relation each being at one corner of a triangle and interlock means engaging said handles to prevent the actuation of the third valve when any two valves are actuated, said interlock means comprising a stationary member mounted on said casing between said handles and a disc supported on said stationary member for sliding motion in any direction in a plane normal to the axes of said handles, said handles engaging the periphery of said disc and being shaped to move said disc on actuation of any two valves into a position where engagement between the periphery of said disc and the handle of said third valve prevents actuation of said third valve.

2. Actuating means according to claim 1 wherein the parts of said handles engaging the periphery of said disc are of frustoconical section converging in the direction of movement of the handles to actuate the valves.

References Cited in the file of this patent

UNITED STATES PATENTS

| | | |
|---|---|---|
| 1,106,432 | Wilcox | Aug. 11, 1914 |
| 1,850,761 | Manypenny | Mar. 22, 1932 |

FOREIGN PATENTS

| | | |
|---|---|---|
| 733,767 | Germany | Apr. 2, 1943 |